(12) United States Patent
Yamamoto et al.

(10) Patent No.: US 12,372,678 B2
(45) Date of Patent: Jul. 29, 2025

(54) CALIBRATION DEVICE AND CALIBRATION METHOD FOR DETECTOR

(71) Applicant: JOB CORPORATION, Yokohama (JP)

(72) Inventors: Shuichiro Yamamoto, Yokohama (JP); Masahiro Okada, Yokohama (JP); Masashi Yamasaki, Yokohama (JP); Daisuke Hashimoto, Yokohama (JP); Hiroaki Hayashi, Kanazawa (JP); Natsumi Kimoto, Kanazawa (JP)

(73) Assignee: Job Corporation, Kanagawa (JP)

( * ) Notice: Subject to any disclaimer, the term of this patent is extended or adjusted under 35 U.S.C. 154(b) by 224 days.

(21) Appl. No.: 18/267,255

(22) PCT Filed: Mar. 12, 2021

(86) PCT No.: PCT/JP2021/010034
§ 371 (c)(1),
(2) Date: Jun. 14, 2023

(87) PCT Pub. No.: WO2022/190350
PCT Pub. Date: Sep. 15, 2022

(65) Prior Publication Data
US 2024/0036223 A1    Feb. 1, 2024

(51) Int. Cl.
*G01T 7/00*     (2006.01)
*G01T 1/24*     (2006.01)

(52) U.S. Cl.
CPC ............... *G01T 7/005* (2013.01); *G01T 1/24* (2013.01)

(58) Field of Classification Search
None
See application file for complete search history.

(56) References Cited

U.S. PATENT DOCUMENTS

| | | | |
|---|---|---|---|
| 11,009,470 B2 | 5/2021 | Yamakawa et al. | |
| 11,045,153 B2 | 6/2021 | Takahashi | |
| 2022/0361830 A1* | 11/2022 | Loustauneau | A61B 6/469 |

FOREIGN PATENT DOCUMENTS

| | | |
|---|---|---|
| JP | 2019-020334 A | 2/2019 |
| JP | 6590381 B2 | 10/2019 |

OTHER PUBLICATIONS

Vespucci et al., "Robust Energy Calibration Technique for Photon Counting Spectral Detectors", IEEE Transactions on Medical Imaging., Apr. 2, 2019, vol. 38, No. 4, pp. 968-978, section II. B. 3), C. -D., F.

(Continued)

*Primary Examiner* — Edwin C Gunberg
(74) *Attorney, Agent, or Firm* — Carrier, Shende & Associates P.C.; Joseph P. Carrier; Fulchand P. Shende

(57) ABSTRACT

Provided is a calibration method for a detector including a plurality of detecting elements each of which generates an electrical pulse signal with a peak value corresponding to an energy value of incident X-ray photons and counts a photon count for each peak value, including: applying a predetermined tube voltage to an X-ray tube for irradiating the detector with X-rays; acquiring the photon count for each peak value from each of the detecting elements; estimating a maximum peak value H within a range in which X-ray photons are detected and at which the peak value is maximum; and calculating, for each of the detecting elements, a calibration value that associates the tube voltage with the maximum peak value H.

6 Claims, 6 Drawing Sheets

(56) References Cited

OTHER PUBLICATIONS

Zambon et al., "A wide energy range calibration algorithm for X-ray photon counting pixel detectors using high-Z sensor material", Nuclear Inst. and Methods in Physics Research, A., Feb. 12, 2019, vol. 925, pp. 164-171, section 3.1, 4.1, fig. 1-2.

* cited by examiner

CALIBRATION DEVICE AND CALIBRATION METHOD FOR DETECTOR

TECHNICAL FIELD

The present invention relates to a calibration device and calibration method for a detector having multiple detecting elements or detection pixels (hereinafter collectively referred to as detecting elements) that generate electrical pulse signals with peak values corresponding to the energy values of X-ray photons and count the photon count for each peak value. More specifically, the present invention relates to a calibration device and calibration method that can accurately perform calibration of the energy values measured by the detecting elements.

BACKGROUND ART

Various X-ray devices have been proposed (see Patent Document 1 for example). Patent Document 1 discloses a configuration of a detector that includes multiple detecting elements and can acquire the photon count and energy values of X-ray photons for each detecting element. The detector is configured to generate an electrical pulse signal from the detecting element when X-ray photons are incident, and convert the peak value of this electrical pulse signal into the energy value of the photons.

In addition, the X-ray device described in Patent Document 1 has an energy discrimination function. Multiple energy values are set as boundaries, and multiple ranges of energy values (energy bins) is predetermined. The detector has the function to discriminate which energy bin the incident photons belong to for each detecting element. By using different correction data for each energy bin and performing corrections, it is possible to improve the measurement accuracy of the X-ray device.

In order to determine which energy bin the energy values of photons detected by the detecting elements belong to, each detecting element is required to accurately measure the energy values of photons, particularly at the boundary energy values of the energy bins. In other words, when multiple photons with a specific energy value enter multiple detecting elements, one photon per element, the same energy value should be obtained from each detecting element. Here, whether simultaneous or discrete in time, the same energy value should be obtained. In detectors performing energy discrimination with set energy bins, it is important that the boundaries of the energy bins belonging to each detecting element align between the detecting elements, and ideally, match the desired energy intended by the operator of the detector.

However, due to the influence of accuracy and other factors during the manufacturing of detecting elements, there is actually a variation in the energy values obtained for each detecting element. By calibrating the relationship between the peak values and the energy values outputted by each detecting element and obtaining accurate energy values, it is possible to further improve the measurement accuracy of the X-ray device.

PRIOR ART DOCUMENT

Patent Document

Patent Document 1: Japanese Patent No. 6590381

SUMMARY OF THE INVENTION

Problem to be Solved by the Invention

The present invention has been made in view of the above problems, and an object thereof is to provide a calibration device and a calibration method that can accurately perform calibration of the energy values measured by the detecting elements.

Means for Solving the Problem

A calibration device to achieve the object is a calibration device for a detector including a plurality of detecting elements each of which generates an electrical pulse signal with a peak value corresponding to an energy value of incident X-ray photons and counts a photon count for each peak value, the calibration device including: an X-ray tube control unit that controls a tube voltage of an X-ray tube for irradiating the detector with X-rays; an acquisition unit that acquires the photon count for each peak value from each of the detecting elements and acquires the tube voltage of the X-ray tube; a calculation unit that estimates a maximum peak value within a range in which X-ray photons are detected from values obtained by the acquisition unit and at which the peak value is maximum; and a calibration unit that calculates, for each of the detecting elements, a calibration value that associates the tube voltage acquired by the acquisition unit with the maximum peak value.

A calibration method to achieve the object is a calibration method for a detector including a plurality of detecting elements each of which generates an electrical pulse signal with a peak value corresponding to an energy value of incident X-ray photons and counts a photon count for each peak value, the calibration method including: applying a predetermined tube voltage to an X-ray tube for irradiating the detector with X-rays; acquiring the photon count for each peak value from each of the detecting elements; estimating a maximum peak value within a range in which X-ray photons are detected and at which the peak value is maximum; and calculating, for each of the detecting elements, a calibration value that associates the tube voltage with the maximum peak value.

Effects of the Invention

According to the present invention, it is possible to calibrate the detecting elements using the maximum peak value. The maximum peak value corresponds to the maximum value of energy that X-ray photons can obtain from the X-ray tube, and corresponds to the tube voltage. This is advantageous for accurately calibrating the energy values measured by the detecting elements.

MODES FOR CARRYING OUT THE INVENTION

Figure 1:
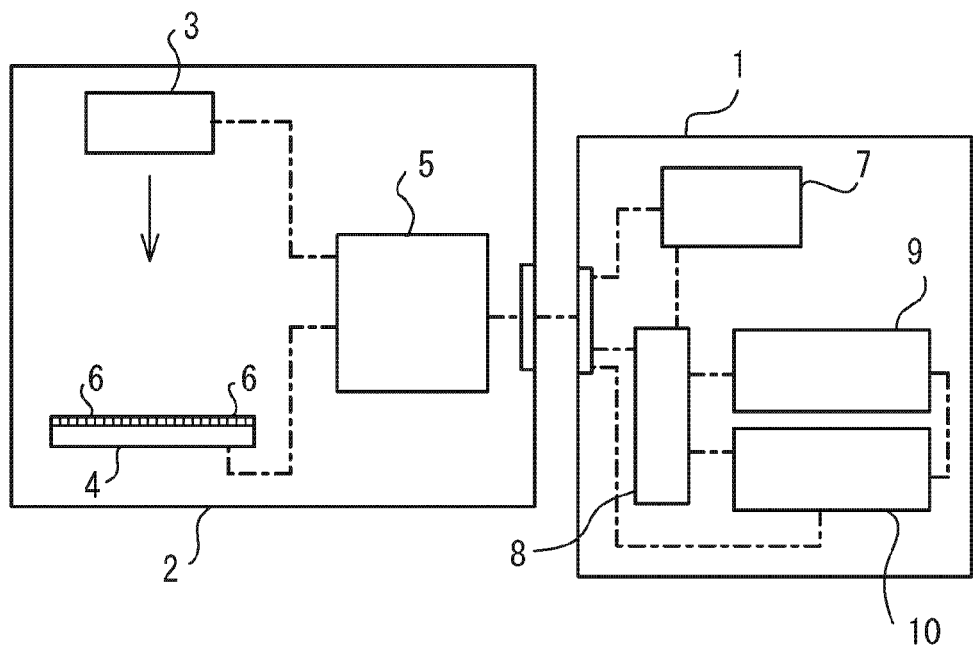
FIG. 1 is an explanatory diagram illustrating an overview of a calibration device connected to an X-ray device.

Hereinafter, a calibration device and a calibration method for a detector will be described based on the embodiments shown in the drawings.

As illustrated in FIG. 1, a calibration device 1 is used by being connected to an X-ray device 2. The X-ray device 2 is used in food inspection and medical practice. The X-ray device 2 includes an X-ray tube 3 that emits X-rays, a detector 4 that detects the X-rays emitted from the X-ray tube 3, and a control mechanism 5 that controls the X-ray tube 3 and the detector 4.

The X-ray tube 3 is configured to emit continuous X-rays by being supplied with electricity having a predetermined voltage value and current value under the control of the control mechanism 5. The X-ray tube 3 emits X-rays toward a measurement target object arranged between the X-ray tube 3 and the detector 4.

The detector 4 is configured to detect X-rays emitted from the X-ray tube 3 and transmitted through the measurement target object. The detector 4 includes a plurality of detecting elements 6 arranged side by side in a plane. The detecting element 6 is configured to generate an electrical pulse signal with a peak value corresponding to the energy value of incident X-ray photons and to count the photon count. The detecting element 6 is composed of a direct conversion semiconductor, such as a CdTe (cadmium telluride) based semiconductor, and a semiconductor such as a photon counting type ASIC (application specific integrated circuit) that amplifies and digitizes signals from the direct conversion semiconductor.

The configuration of the detecting element 6 is not limited to the above. The detecting element 6 may have a configuration that can acquire the energy value and photon count of X-ray photons.

The control mechanism. 5 is, for example, a computer. The control mechanism 5 is configured to control the voltage value and current value of electricity supplied to the X-ray tube 3. The control mechanism 5 is configured to acquire data from the detector 4. This data is used to display an X-ray image on a monitor or the like connected to the outside of the X-ray device 2, for example. The control mechanism 5 is connected to the X-ray tube 3 and the detector 4 by signal lines. In FIG. 1, the signal lines are indicated by dashed lines for explanation. In addition, the arrow indicates the direction of emitting X-rays.

The calibration device 1 is connected to the control mechanism 5 of the X-ray device 2 via a signal line. The calibration device 1 may be configured to be incorporated inside the X-ray device 2.

The calibration device 1 includes an X-ray tube control unit 7 that controls the tube voltage of the X-ray tube 3. The X-ray tube control unit 7 can act on the control mechanism 5 to control the electric voltage (tube voltage) supplied to the X-ray tube 3. The X-ray tube control unit 7 may be configured to control the electric current (tube current) supplied to the X-ray tube 3 in addition to the tube voltage.

The calibration device 1 includes an acquisition unit 8 that acquires the photon count for each peak value from a plurality of detecting elements 6 forming the detector 4. In the present embodiment, the acquisition unit 8 acquires the photon count for each peak value acquired by the control mechanism 5 from the detector 4. The acquisition unit 8 is also configured to acquire the tube voltage from the X-ray tube control unit 7. The acquisition unit 8 may be configured to acquire the tube voltage from the control mechanism 5.

The calibration device 1 includes a calculation unit 9 that estimates a maximum peak value H within a range in which X-ray photons are detected from values obtained by the acquisition unit 8 and at which the peak value is maximum. The maximum peak value His estimated by the calculation unit 9 for each detecting element 6.

The calibration device 1 includes a calibration unit 10 that calculates a calibration value d that associates the tube voltage obtained by the acquisition unit 8 with the maximum peak value H estimated by the calculation unit 9. The calibration value d is calculated by the calibration unit 10 for each detecting element 6. The calibration value d obtained by the calibration unit 10 is sent to the control mechanism 5 and stored therein. The control mechanism 5 can calibrate the data acquired by the detector 4 with the calibration value d. Additionally, when the detector 4 has a fine adjustment mechanism for peak value and peak value detection threshold, the control for fine adjustment can be performed based on the calibration value d, allowing the energy value output itself to be adjusted to the same value.

The X-ray tube control unit 7 and the like included in the calibration device 1 are connected by signal lines. In FIG. 1, the signal line is indicated by a dashed-dotted line for explanation. Signal lines used for the calibration device 1 and the X-ray device 2 may be wired or wireless.

Next, a method for calibrating the detector 4 will be described. First, the calibration device 1 is connected to the X-ray device 2 with a signal line or the like. The X-ray tube control unit 7 determines the electric voltage to be supplied to the X-ray tube 3 and the like. For example, the X-ray tube control unit 7 supplies electricity to the X-ray tube 3 through the control mechanism 5 so that the tube voltage is 40 kV and the tube current is 0.5 mA. For example, by arranging an aluminum filter between the X-ray tube 3 and the detecting element 6, or by adjusting the distance between the X-ray tube 3 and the detecting element 6, a low dose of X-rays, for example, 300 CPS (counts per second), is emitted from the X-ray tube 3 to the detector 4 onto the detecting element 6. In the embodiment shown in FIG. 1, nothing is arranged between the X-ray tube 3 and the detector 4. Measurement by the X-ray device 2 is continued for a predetermined measurement time, such as two hours.

Figure 2:
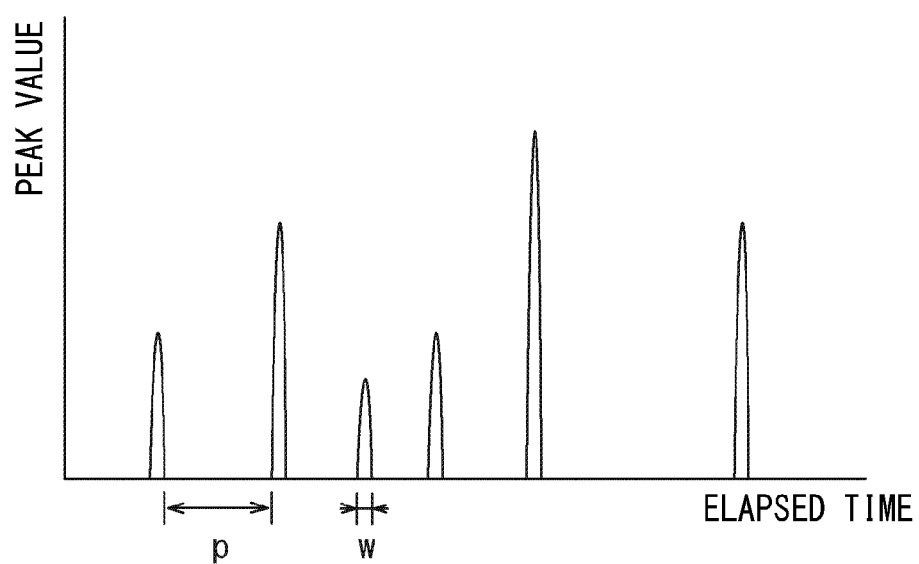
FIG. 2 is an explanatory diagram illustrating the state of peak values outputted from a detecting element.

As illustrated in FIG. 2, each time X-ray photons are incident, the detecting element 6 of the detector 4 generates an electrical pulse signal with a peak value corresponding to the energy value of the photons. The larger the energy value possessed by X-ray photons, the larger the peak value of the electrical pulse signal sent from the detecting element 6 to the control mechanism 5. Note that the aforementioned low dose of X-rays is a dose at which the pile-up phenomenon can be ignored during photon counting. There is no general definition of what CPS is low dose. If the dose is 300 CPS, the interval between X-ray photons incident on each detecting element 6 is 3.3 ms on average. In this case, the pulse interval p of electrical pulse signals is 3.3 ms on average. For example, when the pulse width w is 300 ns, average (p/w) =10000, and the pulse width w becomes significantly shorter compared to the pulse interval p, making the pile-up phenomenon almost negligible. As above, in the present specification, a state where the pile-up phenomenon can be almost ignored is referred to as an ultra-low dose state. Also, in the present specification, a state with an average (p/w) of 100 or more is referred to as a low dose state.

Figure 3:
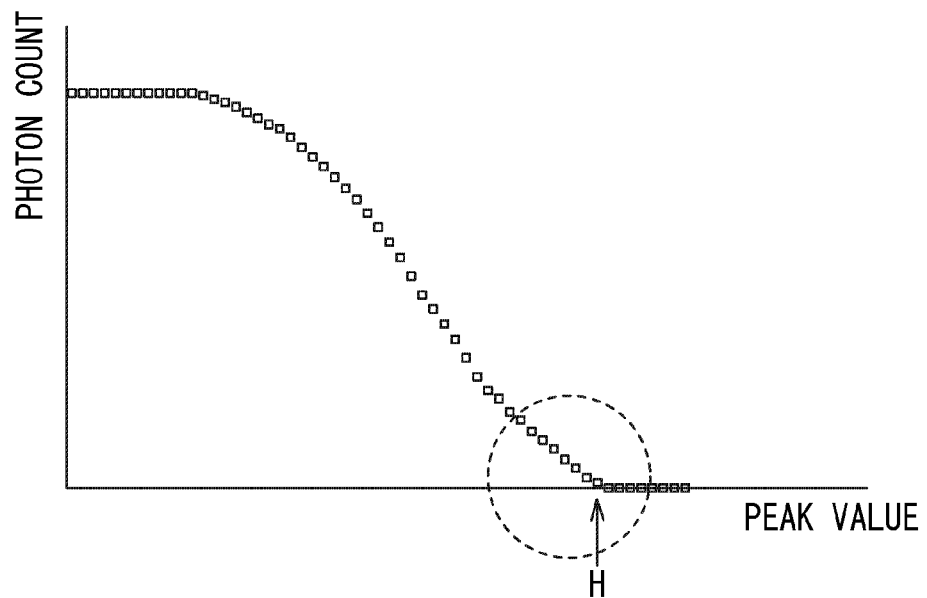
FIG. 3 is a graph illustrating the relationship between the photon count and the peak value.

The acquisition unit 8 of the calibration device 1 acquires the photon count for each peak value via the control mechanism 5. The acquisition unit 8 can acquire a graph illustrating the relationship between the photon count and the peak value, as illustrated in FIG. 3. The photon count for each peak value is, in practice, the photon count with a peak value equal to or greater than a certain peak value hx, and in the present specification, the photon count with a peak value that falls within the range of the infinitely high peak value (h=∞), which exists only by definition, and the peak value hx is denoted as C(∞: hx). As another example, the photon count representing a certain range of peak values, the photon count with a peak value that falls within the range of peak value hx1 and peak value hx2, is denoted in a similar notation as C(hx1:hx2).

Next, based on the data acquired by the acquisition unit 8, the calculation unit 9 estimates the maximum peak value H. As illustrated in FIG. 3, when the vertical axis is the photon count and the horizontal axis is the peak value, the peak value when the photon count is zero is defined as the maximum peak value H in the present specification. The maximum peak value H is the value of the peak value within a range in which X-ray photons are detected and at which the peak value is maximum.

In the present embodiment, the photon counting type ASIC included in the detecting element 6 is configured to acquire an integrated value obtained by integrating the photon count up to infinity height with respect to the peak value (photon energy). It is preferable to use a photon counting ASIC that acquires integral values such as C (∞:hx) rather than difference values such as C (hx1:hx2), as it results in smaller measurement errors and improves the calibration accuracy. This is because the difference calculation or the use of the difference calculation circuit inside the ASIC increases errors due to the error propagation law during the difference calculation. A photon counting type ASIC included in the detecting element 6 may be configured to acquire difference values. Note that if the photon counting type ASIC is configured to acquire integral values, the calculation unit 9 may be configured to acquire difference values by calculation.

The range in which photons are detected refers to the range of peak values in which X-ray photons can be detected. It can be said that the range in which photons are detected is a range excluding a range in which the photon count is obviously zero from the shape of the graph illustrated in FIG. 3, for example. The range in which photons are detected is not limited to the range in which the photon count is 1 or more. Even if the photon count actually detected is zero, it may be included in this range if there is a possibility that photons could be detected.

Theoretically, the maximum peak value H does not exceed the energy value of the tube voltage of the X-ray tube 3 in the case of an ultra-low dose state, in which the pile-up phenomenon is negligible. This is because the X-ray tube 3 cannot generate X-ray photons having energy higher than the energy obtained from the tube voltage. For example, when the tube voltage is 40 kV, the maximum energy value of X-ray photons is 40 keV. Note that when a pile-up phenomenon occurs, two pulses are synthesized, so that the peak value of the pulse may exceed the maximum peak value H.

As illustrated in FIG. 3, the maximum peak value H detected by a certain detecting element 6 corresponds to the tube voltage. Therefore, when the tube voltage is 40 kV, the maximum peak value H corresponds to an energy value of 40 keV. During the measurement of the target object by the X-ray device 2, when this detecting element 6 detects an electrical pulse signal that matches the maximum peak value H, it can be said that the energy value of the X-ray photons detected by this detecting element 6 is 40 keV.

The calibration unit 10 calculates a calibration value d that associates the tube voltage acquired by the acquisition unit 8 with the maximum peak value H obtained from the calculation unit 9. This calibration value d is sent to the control mechanism 5 of the X-ray device 2 and stored therein. When measuring the target object, the X-ray device 2 can perform calibration using the calibration value d for the data obtained from the detector 4, and can then utilize this calibration when outputting measurement results such as X-ray images.

Calibration by the calibration device 1 enables all the detecting elements 6 to output accurate energy values at least for the energy value corresponding to the maximum peak value H. The energy values of a plurality of detecting elements 6 can each be calibrated with respect to one index, tube voltage. When X-ray photons having the same energy value are incident, any detecting element 6 will detect the same energy value. The ability to calibrate the energy value obtained from each detecting element 6 allows energy analysis by the detector 4. It becomes possible to use the detector 4 as an energy analyzer.

By changing the tube voltage with the X-ray tube control unit 7, it becomes possible to perform the same measurements as previously mentioned at different tube voltages. The calibration device 1 changes the tube voltage, for example, from 40 kV to 80 kV, estimates the maximum peak value H for each detecting element 6, and calculates the calibration value d. As a result, all detecting elements 6 can accurately output the energy values of the photons for the X-ray photons with energy values of 40 keV and 80 keV.

Figure 4:
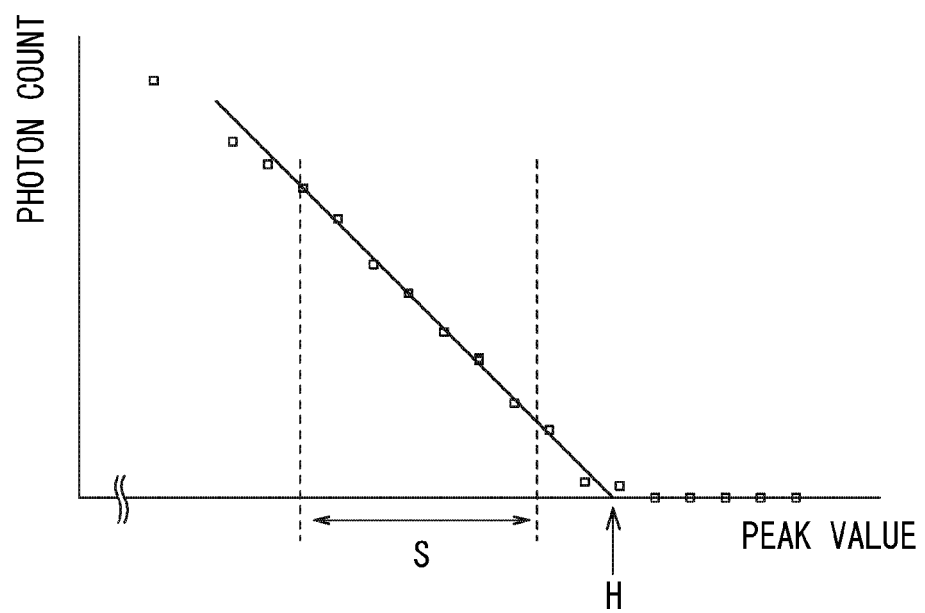
FIG. 4 is a graph illustrating an enlarged section surrounded by a dashed circle in FIG. 3.

A specific example of estimating the maximum peak value H will be described below. FIG. 4 illustrates an enlarged area surrounded by a dashed circle in FIG. 3. As illustrated in FIG. 4, in the region near the maximum peak value H (extraction region S), it is possible to estimate the maximum peak value H by determining an approximate straight line or approximate curve based on the relationship between the photon count and the peak value.

The extraction region S is set within a predetermined range that is smaller than the peak value corresponding to the tube voltage. For example, when the tube voltage is 40 kV, the extraction region S can be set in the range of 35 keV to 38 keV. In reality, the extraction region S is a region sandwiched between the peak value corresponding to an energy value of approximately 35 keV and the peak value corresponding to an energy value of approximately 38 keV.

The relationship between these energy values and peak values is the value before being calibrated by the calibration device 1.

As illustrated in FIG. 4, in the graph illustrating the relationship between the photon count y and the peak value h, the data within the range of the extraction region S is linearly approximated. At this time, the formula for the straight line, $y=-ah+b=-a(h-H)$, is obtained, where $b=a\times H$. For the photon count to be zero ($y=0$) in this formula for the straight line, $h=H$ must be established. The peak value h is determined as the maximum peak value H. This maximum peak value H corresponds to the energy value corresponding to the tube voltage.

If the maximum peak value H estimated by the calculation unit 9 is, for example, a magnitude corresponding to an energy value of 39.8 keV, the calibration value d for setting this to an energy value of 40.0 keV corresponding to the tube voltage is calculated by the calibration unit 10. For example, let the calibration value $d=40.0/39.8$. For the peak value h obtained from the detecting element 6, the energy value is calibrated assuming that the energy value corresponding to the peak value dh is the true value.

For example, it may be that the calibration value $d=40.0-39.8=0.02$. For the peak value h obtained from the detecting element 6, the energy value is calibrated assuming that the energy value corresponding to the peak value h+d is the true value. The calibration value d is calculated for each detecting element 6 and calibrated for each detecting element 6 with the corresponding calibration value d.

The accuracy of the calibration value d can be improved by setting the extraction region S to a range smaller than the peak value corresponding to the tube voltage. Since the photon count detected by the detecting element 6 decreases near the maximum peak value H, the measurement error increases. The accuracy of calibration can be improved by excluding the range in which the error tends to increase from the extraction region S. For example, the extraction region S may be set by determining the lower limit value of the photon count. The configuration may be such that data in which the photon count is 10 or less near the maximum peak value H is excluded from the extraction region S. This is advantageous for improving the accuracy of calibration by the calibration device 1.

The reason why the error increases as the photon count decreases is that the generation probability of X-ray photons emitted from the X-ray tube 3 follows Poisson statistics. The standard deviation of the error distribution for the photon count C measured in a certain period of time is $\sqrt{c}$. The ratio of this standard deviation to the photon count is $\sqrt{c}/c=1/\sqrt{c}$, so that the more the photon count C decreases, the larger the ratio of error.

When determining the lower limit value of the photon count C and setting the extraction region S, one can first tentatively determine the extraction region S, then calculate the degree of approximation of the approximate straight line, and perform similar calculations while changing the extraction region S, adopting the extraction region S with the highest degree of approximation. With this method, even if the size of the detecting element 6 changes due to intentional or manufacturing variations or other circumstances, the energy value can be accurately calibrated.

When the size of the detecting element 6 (the area of the surface irradiated with X-rays) changes, the photon count C increases or decreases by the area ratio. Therefore, fixing the lower limit value of the photon count C is not appropriate in some cases. However, there is no doubt that the ratio of this standard deviation to the photon count C, $\sqrt{c}/c=1/\sqrt{c}$, affects the error. On condition that near the maximum peak value H, data in which the photon count C is less than or equal to a fixed value is excluded from the extraction region S, the extraction region S with the highest degree of approximation can be searched and adopted.

It is desirable to perform calibration by the calibration device 1 within a range in which the dose of X-rays emitted from the X-ray tube 3 is in an ultra-low dose state, in which no pile-up occurs. The calibration by the calibration device 1 may be performed in a range where the X-ray dose is in a low dose state. By setting the tube current supplied to the X-ray tube 3 to a relatively small value by the X-ray tube control unit 7, an ultra-low dose state or a low dose state can be achieved. The problem that two or more electrical pulse signals are superimposed due to pile-up and the peak value appears to be large can be avoided by using the ultra-low dose state or the low dose state. It is possible to avoid obtaining a peak value corresponding to an energy value exceeding the tube voltage due to pile-up. Specifically, the tube current is set so that the dose is 1000 CPS or less. Desirably, the tube current is set so that the dose is 300 CPS or less. This is advantageous for further reducing the possibility of pile-up occurring. By controlling the tube current of the X-ray tube 3 with the X-ray tube control unit 7, the dose can be easily adjusted.

Figure 5:
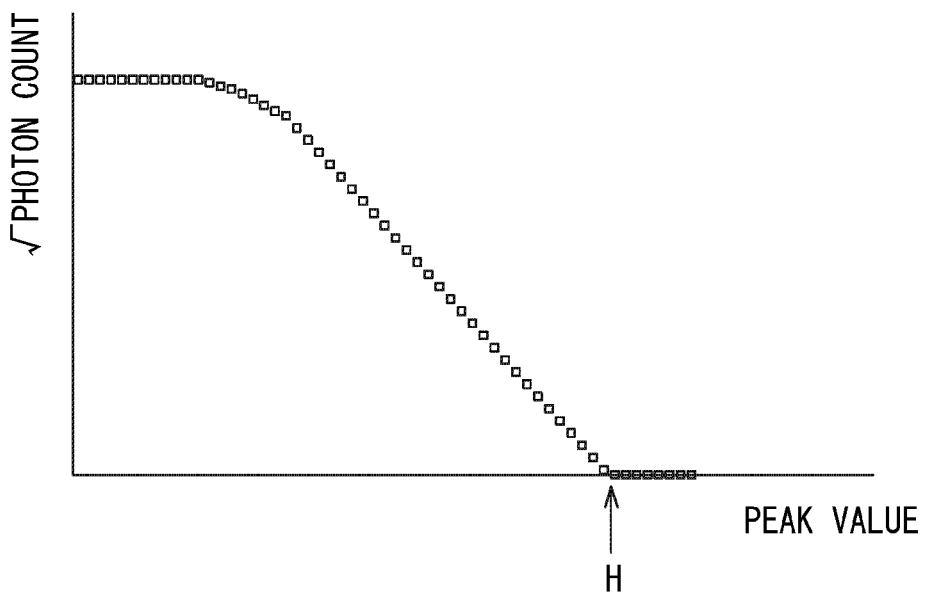
FIG. 5 is a graph illustrating the relationship between the square root of photon count and the peak value.

As illustrated in FIG. 5, the configuration may be such that the acquisition unit 8 acquires a graph illustrating the relationship between the square root of photon count $C(\infty:h)$ and the peak value h. The graph illustrating the relationship between the square root of photon count $C(\infty:h)$ and the peak value h is closer to a straight line than the graph illustrated in FIG. 3 both theoretically and practically. Therefore, it is possible to improve the accuracy when determining the approximate straight line based on the relationship between the square root of photon count and the peak value. Errors in estimating the maximum peak value H can be further suppressed.

The method of estimating the maximum peak value H is not limited to the above. The configuration may be such that the approximation is made using a curve, rather than a straight line, in the extraction region S (for example, polynomial approximation). Alternatively, for example, the graph illustrating the relationship between the square root of photon count C and the peak value h illustrated in FIG. 5 may be generated, and image processing may be used to estimate the maximum peak value H. If the maximum peak value H can be obtained with relatively high accuracy, the maximum peak value H may be estimated by a method other than the above.

A calibration method when the detecting element 6 has an energy discrimination function will be described below. For example, it is assumed that five energy value ranges (energy bins) are set in advance, and the energy values at the boundaries of the energy bins are set to 20 keV, 40 keV, 60 keV, and 80 keV.

Figure 6:
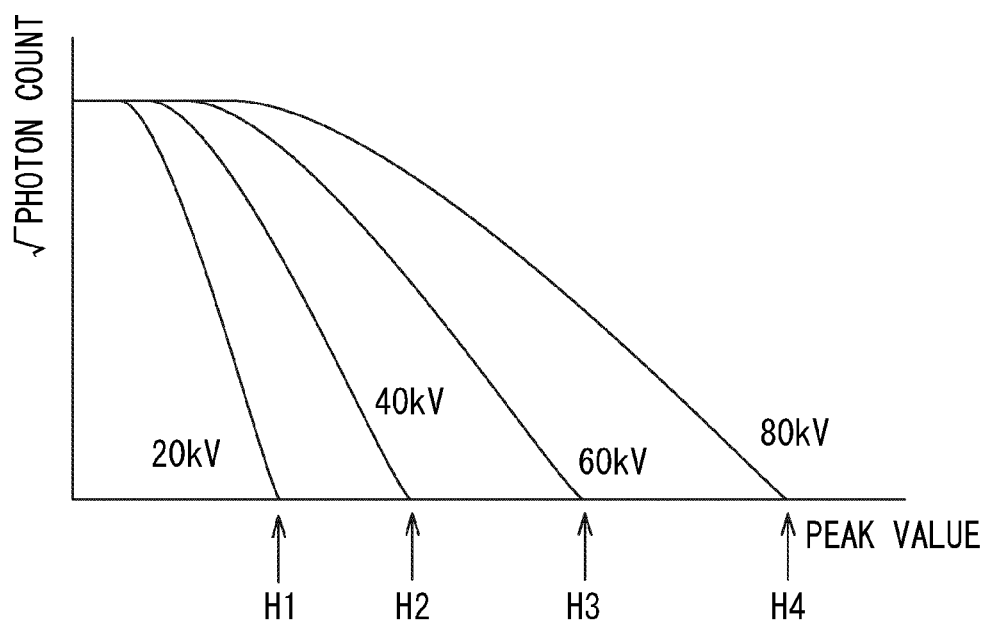
FIG. 6 is a graph illustrating the relationship between the square root of photon count and the peak value when measured multiple times with changed tube voltages.

As illustrated in FIG. 6, the detector 4 first detects X-ray photons for a predetermined time, such as two hours, while the tube voltage is controlled at 20 kV by the X-ray tube control unit 7. Using the data obtained by the detector 4 and the like, the calculation unit 9 estimates the maximum peak value H1. A maximum peak value H1 is estimated for each of the plurality of detecting elements 6 constituting the detector 4. A calibration value d is calculated for each detecting element 6 in the calibration unit 10.

Next, the X-ray tube control unit 7 changes the tube voltage to 40 kV, and the same procedure as above is followed to estimate the maximum peak value H2. Similarly, an estimation is made on the maximum peak value H3 when the tube voltage is kV and the maximum peak value H4 when the tube voltage is kV. It takes, for example, eight hours of measurement time to obtain the four maximum peak values H.

This makes it possible for all detecting elements 6 to exactly output the photon energy values of the X-ray photons having energy values of at least 20 keV, 40 keV, 60 keV, and keV. Therefore, the X-ray device 2 can accurately determine which energy bin the energy value of the photons detected by the detecting element 6 belongs to, and accurately grasp the peak value h corresponding to the energy value that forms the boundary of that energy bin for each detecting element 6.

Figure 7:
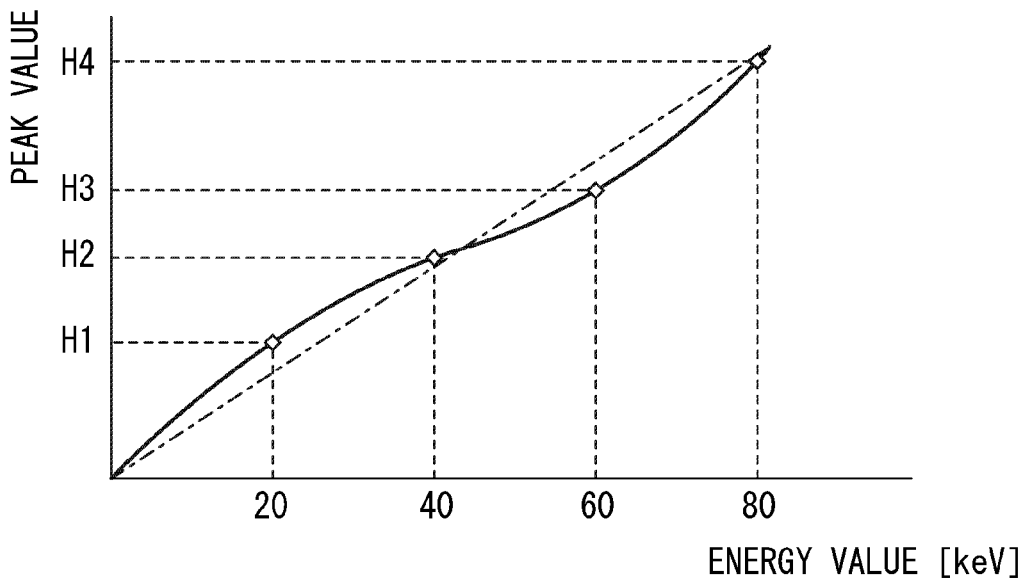
FIG. 7 is an explanatory diagram illustrating the relationship between the peak value and the energy value in a detecting element.

As illustrated in FIG. 7, the detector 4 is designed so that the energy value of the photons incident on the detecting element 6 and the peak value of the electrical pulse signal outputted from the detecting element 6 usually ideally have a proportional relationship. In FIG. 7, the ideal characteristic of the detecting element 6 is indicated by a dashed-dotted line for explanation. However, in reality, as indicated by the solid line, the characteristic may differ from the proportional relationship, and the characteristic may differ for each detecting element 6. In addition, there are cases where the proportional relationship is not achieved at the design stage, and the actual characteristic may deviate from the design due to manufacturing convenience or other causes.

Ideally, the characteristic indicated by the solid line is acquired for each detecting element 6 and calibrated so that an accurate energy value can be acquired from the detected peak value. In this case, by changing the tube voltage by 1 kV stepwise, for example, and repeating the estimation of the maximum peak value H and the acquisition of the calibration value d, it is possible to acquire the characteristic indicated by the solid line in FIG. 7.

On the other hand, when performing calibration by estimating the maximum peak values H1 to H4 limited to the energy values forming the boundaries of energy bins, it is sufficient to acquire the calibration values d only in the vicinity of each of H1 to H4, which significantly reduces the time required for calibration. Further, the detecting element 6 can be accurately calibrated at an energy value that is the boundary of energy bins. The X-ray device 2 can accurately discriminate which energy bin the energy value of the photons detected by the detecting element 6 belongs to, and it is possible to accurately grasp the peak value corresponding to the energy value that forms the boundary of that energy bin for each detecting element 6. Since the measurement accuracy of the X-ray device 2 can be improved, the X-ray device 2 can output highly accurate images.

The calibration device 1 can accurately calibrate the detecting element 6 at any energy value. Therefore, even in the detector 4 having a different energy value being the boundary of energy bins from the above, calibration can be performed with high accuracy. A simple control of changing the tube voltage applied to the X-ray tube 3 makes it possible to change the energy value to be calibrated. The calibration device 1 can accurately calibrate various detectors 4.

Figure 8:
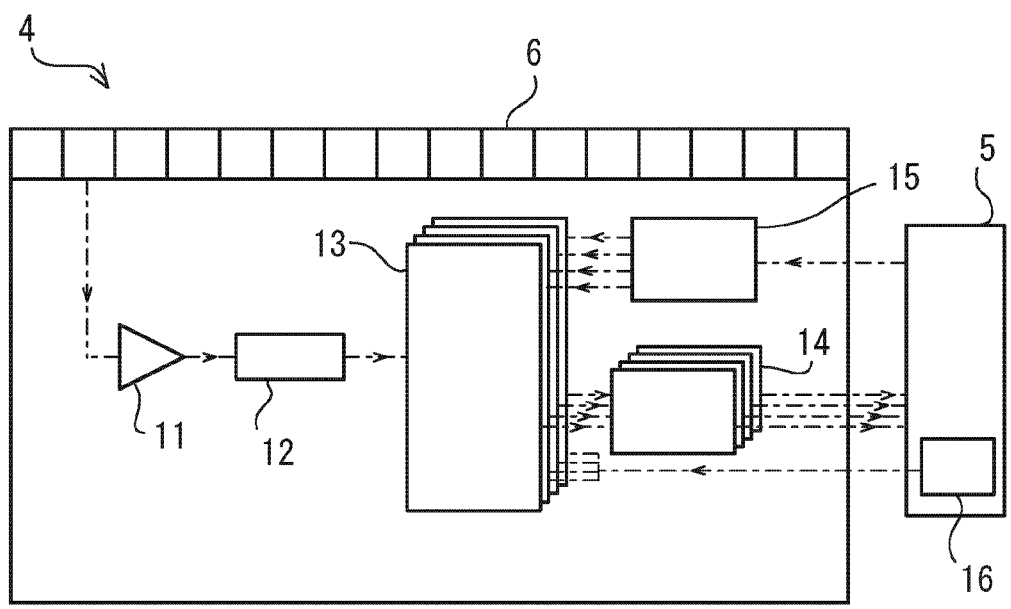
FIG. 8 is an explanatory diagram illustrating the configuration of a detector.

The calibration method will be described more specifically by taking the detector 4 illustrated in FIG. 8 as an example. The detector 4 of this embodiment includes detecting elements 6 each composed of, for example, CdZnTe (Cadmium Zinc Telluride) semiconductor and a photon counting type ASIC connected to the detecting elements 6. The photon counting type ASIC includes a charge amplifier 11 that receives and amplifies charge from the detecting elements 6, a waveform shaper 12 that shapes the waveforms of signals received from the charge amplifier 11, a discriminator 13 that discriminates the signals received from the waveform shaper 12, a counter 14 that counts the signals outputted from the discriminator 13, and a DA converter 15 that sends the signals, sent from the control mechanism 5, to the discriminator 13. In FIG. 8, the signal lines are indicated by dashed-dotted lines for explanation. In addition, the traveling direction of signals is indicated by arrows.

When X-rays are incident on the detecting element 6, a charge proportional to the energy of the X-rays is generated. This charge is sent to the charge amplifier 11. The charge amplifier 11 outputs a waveform with a peak proportional to the amount of charge. The waveform shaper 12 smoothly shapes the waveform received from the charge amplifier 11. If the waveform has fine vibrations due to noise or other factors, the accuracy of subsequent discriminations by the discriminator 13 will be reduced.

Four discriminators 13 are connected to the waveform shaper 12. The discriminator 13 is configured such that it has a reference voltage set in advance and extracts only waveforms having a voltage higher than the reference voltage. The reference voltage is set, for example, to a voltage corresponding to the energy value that is the boundary of energy bins. In reality, the reference voltage is set as the channel number corresponding to an energy value.

For example, if the channel number has a configuration of 0 to 127 (7 bits) and the upper limit of the energy value processed by the discriminator 13 is 80 keV, the range is 0.625 keV per channel. For example, when the energy values serving as the boundaries of the energy bins are set to 20, 40, 60, and 80 keV in the four discriminators 13, the channel numbers set to the discriminator 13 are 32, 64, 96, and 127, respectively. Ideally, the channel number is proportional to the energy value. Also, ideally, the channel number has a proportional relationship with the peak value h.

For example, when an X-ray photon having an energy value of 30 keV is incident on the detecting element 6, the discriminator 13 recognizes it as a photon with channel number 48. In the discriminator 13 whose channel number is set to 32, a digital signal corresponding to channel number 48 is sent to the counter 14. In the discriminator 13 whose channel number is set to 64, no signal is sent to the counter 14 because it is below the reference voltage.

The counter 14 is configured to count the digital signals outputted from the discriminator 13. One counter 14 is connected to one discriminator 13. In this embodiment, the detector 4 has four counters 14. The counter 14 is configured to count the photon count C for each channel number and send the result to the control mechanism 5.

The charge amplifier 11, the waveform shaper 12, the four discriminators 13, and the four counters 14 are arranged for each detecting element 6. That is, the mechanisms other than the DA converter 15 in the photon counting type ASIC illustrated in FIG. 8 are provided for each of the plurality of detecting elements 6.

The DA converter 15 is configured to convert the signals sent from the control mechanism 5 and set a reference voltage for each discriminator 13. The DA converter 15 is configured to collectively set reference voltages for the plurality of discriminators 13 included in the photon counting type ASIC.

The control mechanism 5 may have the fine adjustment mechanism 16. The fine adjustment mechanism 16 is configured to finely adjust the reference voltage by sending a signal to the discriminator 13. In reality, the reference voltage is finely adjusted as a trim number. Adjustment of the reference voltage by the fine adjustment mechanism 16 can be performed with different values for each discriminator 13. The fine adjustment mechanism 16 can be adjusted with different trim numbers for the plurality of detecting elements 6.

The calibration device 1 calibrates the energy value by adjusting the reference voltage of the discriminator 13. If the upper limit of the energy value measurable by the detector 4 is, for example, 80 keV, ideally, channel number 0 corresponds to an energy value of 0 keV and channel number 127 corresponds to an energy value of 80 keV.

If X-rays are measured at a tube voltage of 40 kV at this time, measurement results similar to the graph illustrated in FIG. 5 are obtained. Ideally, the photon count C for channel number 64 is 1 or more, and the photon count C for channel number 65 or more is 0. That is, it can be estimated that channel number 64 is the closest integer value to the maximum peak value H. It is assumed that the energy value corresponding to channel number 64 is 40 keV.

Figure 9:
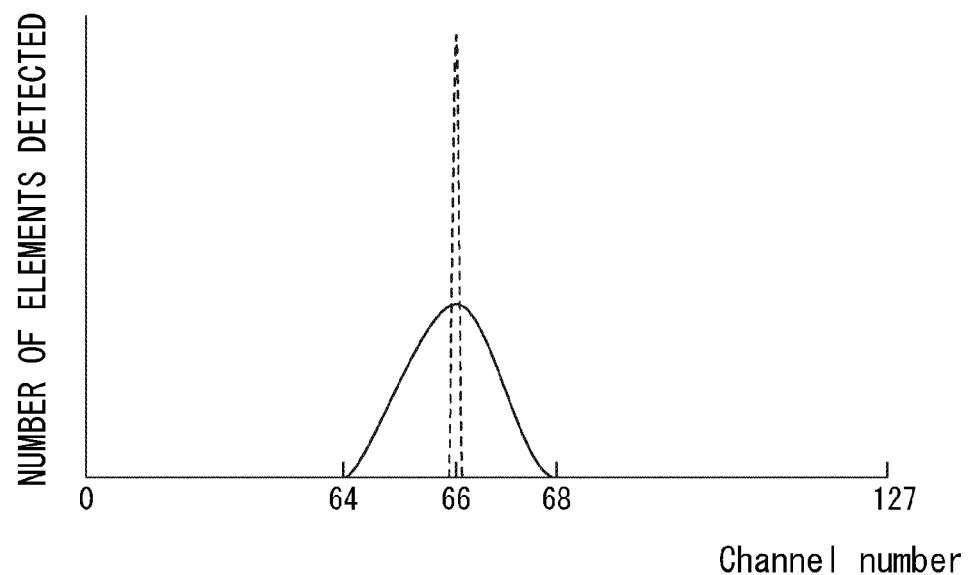
FIG. 9 is a graph illustrating the relationship between the outputted channel number and the number of detecting elements.

Next, the calibration device 1 estimates the maximum peak value H for each detecting element 6. In actual measurement, some of the detecting elements 6 output the maximum peak value H as channel numbers 62 and 66. FIG. 9 illustrates the relationship between the channel number estimated as the maximum peak value H and the number of detecting elements 6 therefor. For X-rays having an energy value of 40 keV, variation occurs in the channel number outputted from each detecting element 6. If the median value of the graph is channel number 66 as illustrated in FIG. 9, the channel number is adjusted via the control mechanism 5. Channel number 66 is set as the boundary of energy bins corresponding to an energy value of 40 keV.

That is, the calibration device 1 adjusts the reference voltage of the discriminator 13 via the control mechanism 5. The channel number corresponding to the energy value of 40 keV is changed from 64 to 66 in the discriminator 13.

The detector 4 before calibration was in a state where when the channel number outputted from discriminator 13 was 64, the corresponding energy value was assumed to be 40 keV. It can be seen from the measurement by the calibration device 1 that the energy value was actually below 40 keV when the channel number was 64. The channel number 66, as the obtained calibration value d, is sent from the calibration device 1 to the control mechanism 5. For the detector 4 after calibration, when the channel number outputted from the discriminator 13 is 66, the corresponding energy value is 40 keV. This detector 4 can accurately measure the energy value of 40 keV.

The calibration device 1 may be configured to acquire data corresponding to the graph illustrated in FIG. 9 and extract the median value. In this case, the calibration device 1 works on the control mechanism 5 to reset the channel number. Specifically, the reference voltage of the discriminator 13 is changed from the control mechanism 5 via the DA converter 15, based on the calibration value d sent from the calibration device 1.

For X-rays having an energy value of 40 keV, a large number of detecting elements 6 are in a state of outputting channel number 66. When channel number 66 is outputted, the measured X-ray photons will have an energy value of approximately 40 keV. One reference voltage corresponding to channel number 66 is set for all of the plurality of detecting elements 6.

If the control mechanism 5 includes the fine adjustment mechanism 16, the calibration accuracy can be further improved. As illustrated in FIG. 9, some of the detecting elements 6 output channel number 64 other than channel number 66, which gives the maximum peak value H. The channel number varies between 64 and 68. In other words, some of the detecting element 6 output the X-ray photons of 40 keV as 38.75 to 41.25 keV.

The fine adjustment mechanism 16 fine tunes the reference voltage as a trim number for the energy value. For example, a case where the trim number has a configuration of 0 to 15 (4 bits) will be described. As illustrated in FIG. 9, when there is a ±2 variation range with respect to the median value channel number 66, the range corresponding to four channel numbers is first set as the trim range. The range per trim number corresponds to a range of 0.25 channel numbers.

The maximum peak value H estimated for each detecting element 6 by the calibration device 1 is calculated as a channel number. The channel number is a digital value and a numerical value with only an integer part, but the channel number estimated as the maximum peak value H has a numerical value including a decimal part.

In a certain detecting element 6, where the channel number set from the control mechanism 5 to the DA converter 15 is 66, and the initial setting value of the trim number is 7, and the maximum peak value H is estimated to be at channel number 66.5, the trim number of this detecting element 6 is set to +2. This trim number +2 is sent from the calibration device 1 to the control mechanism 5 as the obtained calibration value d. As a result, the reference voltage in the discriminator 13 increases by the same amount as the channel number of 0.5. That is, in this detecting element 6, the channel number 66.5 coincides with the energy value of 40 keV. This detecting element 6 counts the photon count C using the channel number 66.5 as the boundary of energy bins of 40 keV. A trim number is determined for each of the detecting elements 6 in the same manner as described above.

The calibration device 1 may be configured to determine the trim range based on variations in the maximum peak value H for each detecting element 6. Further, the calibration device 1 may be configured to determine the trim number based on the estimated maximum peak value H. Specifically, the fine adjustment mechanism 16 of the control mechanism 5 finely adjusts the reference voltage of the discriminator 13 based on the calibration value d sent from the calibration device 1.

The channel number corresponding to the actual peak value H used for determination by the discriminator 13 is a value very close to the channel number (integer) set in the DA converter 15 from the control mechanism 5. If the boundary of energy bins is set at 40 keV, then photons with energy values 40 keV or less are counted as being included in the bin below the boundary. At this time, the channel number corresponding to the actual peak value H used for determination is a value very close to 66. Photons with energy values greater than 40 keV, on the other hand, are counted as being included the bin above the boundary. At this time, the channel number corresponding to the actual peak value H used for determination is a value very close to 66. With an energy value of 40 keV as a boundary, photon energy values are discriminated with high accuracy.

The calibration device 1 may have a configuration such that after calibration, the calibration device 1 performs re-measurement and evaluates the calibration results. After calibration by the fine adjustment mechanism 16, all the detecting elements 6 fall within the channel number range of 66±0.25, for example. At this time, the result illustrated by the dashed line in FIG. 9 is obtained. All detecting elements 6 can detect X-ray photons having an energy value of 40 keV with an accuracy of 40 keV±0.16 keV.

In this embodiment, the calibration unit 10 calculates the channel number and trim number set by the calibration device 1 as the calibration value d. By sending this calibration value d from the calibration device 1 to the control mechanism 5, it is possible to accurately perform energy value calibration in the X-ray device 2.

If the correspondence relationship between the trim number of the fine adjustment mechanism 16 and the channel number is out of proportion, it is conceivable that the energy value after calibration will not converge as expected. Even in such a case, the accuracy of calibration can be improved by repeating the setting and measurement (calibration) of the channel number and trim number. The configuration may be such that if there is a detecting element 6 whose energy value after calibration cannot converge, it is treated as a defective pixel. The calibration device 1 sends defective pixel information such as positional information for identifying defective pixels to the control mechanism 5 as a calibration value d. The configuration may be such that in the X-ray device 2, the control mechanism 5 eliminates the signal obtained from the detecting element 6 determined as a defective pixel based on the defective pixel information. The control mechanism 5 becomes a state of not using signals obtained from the detecting element 6 determined as a defective pixel. In an image analyzer using the detector 4, by not using the data of defective pixels during data analysis, it is possible to prevent the inclusion of relatively large error data in energy information and improve the analysis accuracy.

The calibration method by the calibration device 1 is not limited to the above. If the detector 4 has a different configuration, for example, such as in a case of a photon counting type ASIC, the calibration value d obtained by the calibration device 1 and the calibration method will change. It suffices that the calibration device 1 uses the maximum peak value H to accurately calibrate the relationship between the signal outputted from each detecting element 6 and the corresponding energy value.

Figure 10:
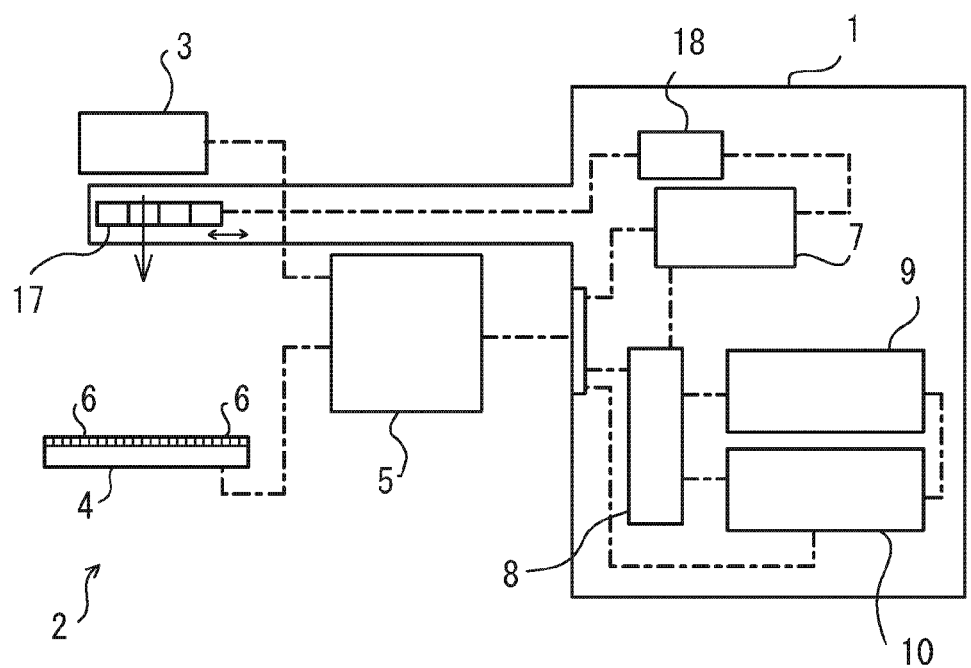
FIG. 10 is an explanatory diagram illustrating a modification of the calibration device of FIG. 1.

As illustrated in FIG. 10, the configuration may be such that the calibration device 1 includes a filter mechanism 17 arranged between the X-ray tube 3 and the detector 4. The filter mechanism 17 has a configuration in which a plurality of filters made of different materials are arranged in a switchable manner. The filter is, for example, a filter made of aluminum with a thickness of 4.0 mm, or a filter made of a combination of aluminum with a thickness of 2.0 mm and copper with a thickness of 0.3 mm. In this embodiment, a plurality of filters made of different materials are arranged and fixed in a direction orthogonal to the X-ray irradiation direction. By moving in the direction of arranging the filters, the filter mechanism 17 can switch the filters through which X-rays pass. In FIG. 10, the direction of moving the filter is indicated by an arrow for explanation.

The filter mechanism 17 may be connected via a signal line to a filter control unit 18 that automatically controls switching of filters. In FIG. 10, the signal lines are indicated by dashed-dotted lines for explanation. The filter control unit 18 acquires the tube voltage from the X-ray tube control unit 7 and automatically switches to a preset filter according to the tube voltage. When the tube voltage of the X-ray tube 3 is changed, the filters of the filter mechanism 17 are switched. Filter switching may be done manually. In this case, the calibration device 1 is configured without the filter control unit 18.

The filter of the filter mechanism 17 can change the quality of X-rays passing therethrough. The filter is selected from materials that increase the photon count in the extraction region S, which is useful in estimating the maximum peak value H, and decrease the photon count in the portion not included in the extraction region S. Therefore, the optimum filter material differs for each tube voltage.

For example, when the tube voltage is 20 kV, a 0.7 mm aluminum filter is used; when it is 40 kV, a filter made of a combination of 2.0 mm aluminum and 0.3 mm copper is used; and when it is 60 kV, a filter made of a combination of 2.0 mm aluminum and 1.4 mm copper is used. When the X-ray device 2 is calibrated, the filter of the filter mechanism 17 is switched according to the tube voltage when changing the tube voltage.

Figure 11:
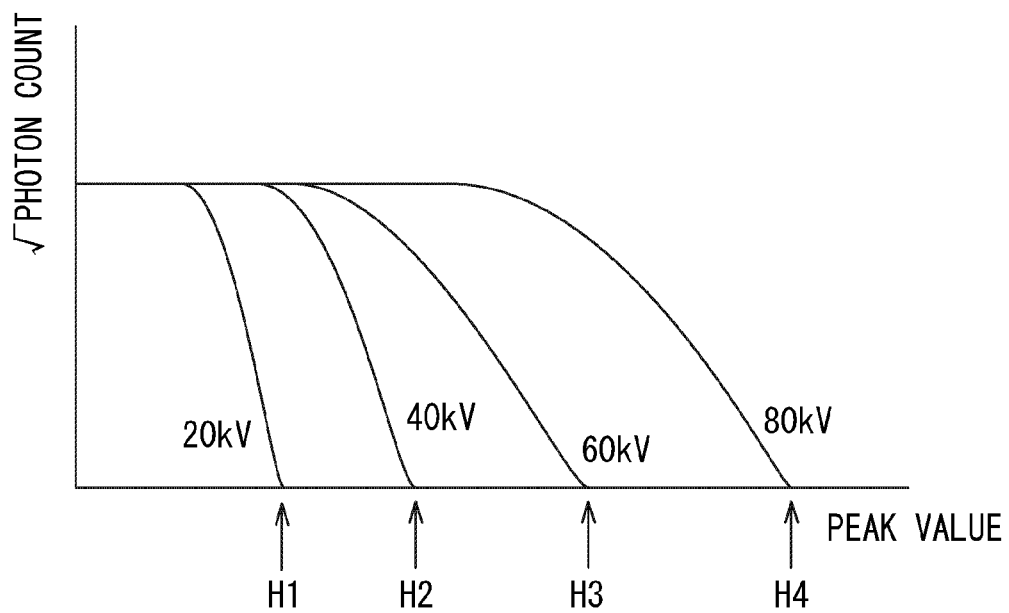
FIG. 11 is a graph illustrating the relationship between the square root of photon count and the peak value when a filter mechanism is used.

Since the photon count in the extraction region S increases as illustrated in FIG. 11, the accuracy in estimating the maximum peak value H can be improved. Moreover, since the photon count in the energy range required for estimating the maximum peak value H is relatively increased, it is possible to shorten the time required for calibration.

As the dose of X-rays emitted from the X-ray tube 3 is reduced, the time intervals between the electrical pulse signals detected by the detecting element 6 increase, making it easier to suppress pile-up. On the other hand, since the X-ray photon count emitted from the X-ray tube 3 decreases, the time required for calibration increases when trying to obtain a certain photon count. By utilizing the filter mechanism 17, it is possible to increase the count of photons required for estimating the maximum peak value H without increasing the total dose of incident radiation on the detector 4, even if the dose from the X-ray tube 3 is increased. This is advantageous for shortening the time required for calibrating the X-ray device 2.

If the calibration device 1 includes the filter control unit 18, the calibration of the X-ray device 2, which takes several hours, can be automatically performed. This is advantageous for efficiently calibrating the detector 4 before shipment in a manufacturing factory of the detector 4 or the like.

When the calibration device 1 is incorporated in the X-ray device 2, it becomes possible to automatically calibrate the X-ray device 2 at night when food production is stopped in a food factory or the like.

EXPLANATION OF REFERENCE NUMERALS 1 calibration device
2 X-ray device
3 X-ray tube
4 detector
5 control mechanism
6 detecting element
7 X-ray tube control unit
8 acquisition unit
9 calculation unit
10 calibration unit
11 charge amplifier
12 waveform shaper
13 discriminator
14 counter
15 DA converter
16 fine adjustment mechanism
17 filter mechanism
18 filter control unit
p pulse interval
w pulse width
H maximum peak value
h peak value d calibration value
S extraction region
C photon count

The invention claimed is:

1. A calibration device for a detector including a plurality of detecting elements each of which generates an electrical pulse signal with a peak value corresponding to an energy value of incident X-ray photons and counts a photon count for each peak value, the calibration device comprising:
    an X-ray tube control unit that controls a tube voltage of an X-ray tube for irradiating the detector with X-rays;
    an acquisition unit that acquires the photon count for each peak value from each of the detecting elements and acquires the tube voltage of the X-ray tube;
    a calculation unit that estimates a maximum peak value within a range in which X-ray photons are detected from values obtained by the acquisition unit and at which the peak value is maximum; and
    a calibration unit that calculates, for each of the detecting elements, a calibration value that associates the tube voltage acquired by the acquisition unit with the maximum peak value, wherein
    the X-ray tube control unit is configured to change the tube voltage in a state corresponding to an energy value serving as a boundary of a plurality of predetermined ranges of energy values, and
    the calibration unit is configured to calculate a calibration value for each tube voltage.

2. The calibration device according to claim 1, wherein the calculation unit is configured to determine an approximate straight line based on a relationship between the photon count and the peak value, within a predetermined range that is smaller than the peak value corresponding to the tube voltage acquired by the acquisition unit, and designates a value of the peak value when the photon count becomes zero on the approximate straight line as the maximum peak value.

3. The calibration device according to claim 1, wherein the calculation unit is configured to determine an approximate straight line based on a relationship between a square root of the photon count and the peak value, within a predetermined range that is smaller than the peak value corresponding to the tube voltage acquired by the acquisition unit, and designates a value of the peak value when the photon count becomes zero on the approximate straight line as the maximum peak value.

4. A calibration method for a detector including a plurality of detecting elements each of which generates an electrical pulse signal with a peak value corresponding to an energy value of incident X-ray photons and counts a photon count for each peak value, the calibration method comprising:
    applying a predetermined tube voltage to an X-ray tube for irradiating the detector with X-rays;
    acquiring the photon count for each peak value from each of the detecting elements;
    estimating a maximum peak value within a range in which X-ray photons are detected and at which the peak value is maximum;
    calculating, for each of the detecting elements, a calibration value that associates the tube voltage with the maximum peak value;
    applying a tube voltage corresponding to one of energy values serving as a boundary of a plurality of predetermined ranges of the energy values to the X-ray tube to acquire the calibration value for each of the detecting elements; and
    applying a tube voltage corresponding to another of the energy values serving as a boundary of the plurality of predetermined ranges of the energy values to the X-ray tube to acquire the calibration value for each of the detecting elements.

5. The calibration method according to claim 4, further comprising: determining an approximate straight line based on a relationship between the photon count and the peak value, within a predetermined range that is smaller than the peak value corresponding to the tube voltage; and designating a value of the peak value when the photon count becomes zero on the approximate straight line as the maximum peak value.

6. The calibration method according to claim 4, further comprising: determining an approximate straight line based on a relationship between a square root of the photon count and the peak value, within a predetermined range that is smaller than the peak value corresponding to the tube voltage; and designating a value of the peak value when the photon count becomes zero on the approximate straight line as the maximum peak value.

* * * * *